T. A. McGINLEY AND J. C. KOPF.
STEERING GEAR.
APPLICATION FILED FEB. 17, 1920.
1,341,334.
Patented May 25, 1920.
3 SHEETS—SHEET 2.
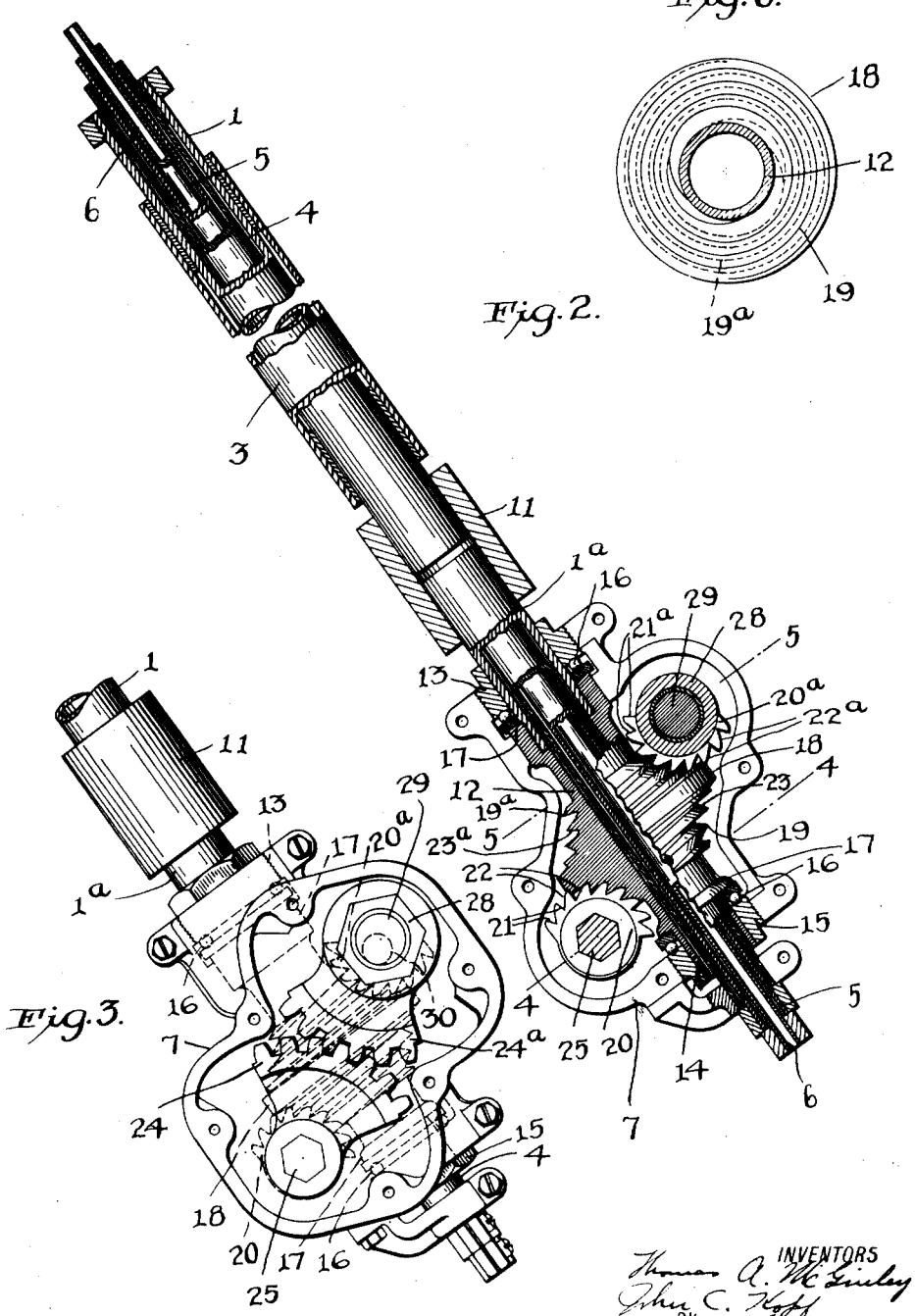

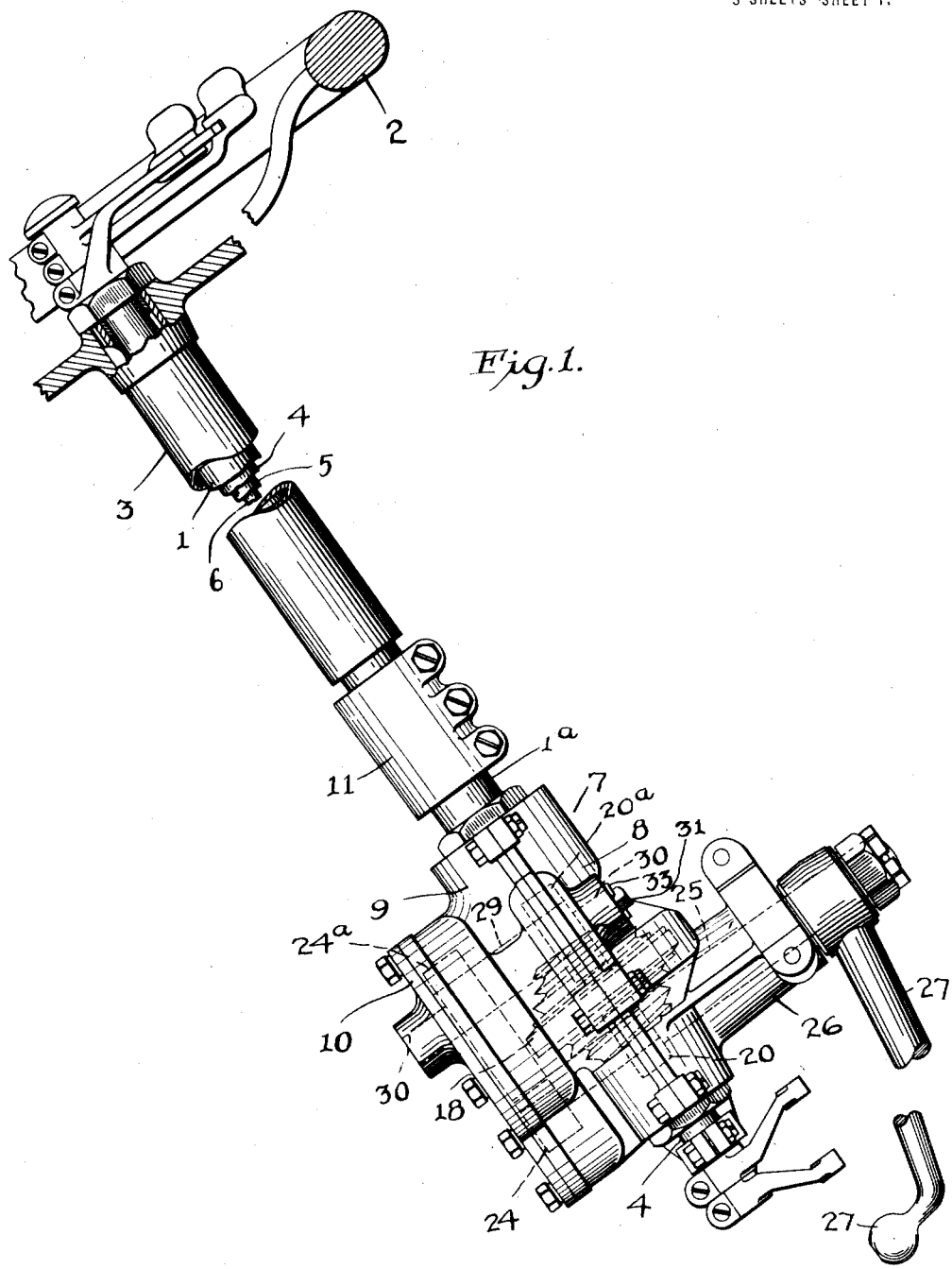

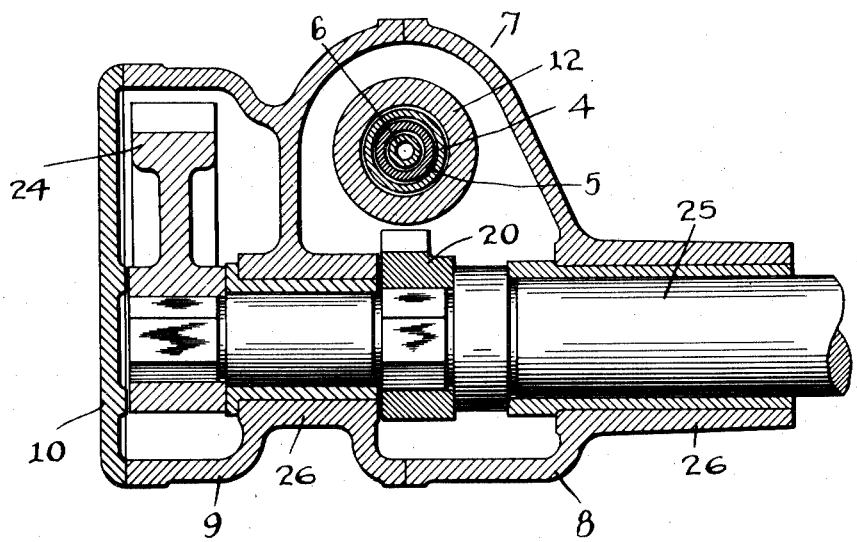
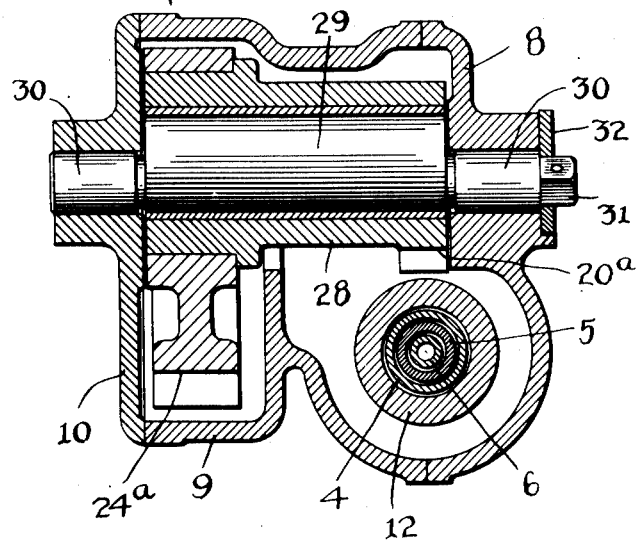

UNITED STATES PATENT OFFICE.

THOMAS A. McGINLEY, OF SEWICKLEY, AND JOHN C. KOPF, OF BELLEVUE BOROUGH, PENNSYLVANIA.

STEERING-GEAR.

1,341,334.  Specification of Letters Patent.  Patented May 25, 1920.

Application filed February 17, 1920. Serial No. 359,443.

*To all whom it may concern:*

Be it known that we, THOMAS A. McGINLEY and JOHN C. KOPF, citizens of the United States, and residents, respectively, of Sewickley and of the borough of Bellevue, in the county of Allegheny and State of Pennsylvania, have invented a new and useful Steering-Gear, of which the following is a specification.

The object of the invention is to provide an automobile steering gear whereof the rotary gear elements can be economically produced and do not require to be alined with special accuracy when assembled, this being an important consideration from the manufacturing standpoint, wherein friction is reduced as compared with the ordinary worm gearings and high mechanical efficiency is secured, thus improving the steering control and reducing the fatigue of repeated operations, and wherein provision is made for effectually taking up the lost motion resulting from wear which is experienced when the wheel is turned from side to side in steering. With worm steering gears there has been no satisfactory way of taking up this lost motion, and, while a certain amount of play or freedom in the wheel may be desirable, the tendency with these gears is to develop an undue range of ineffectual motion, which can only be reduced by setting the worm wheel in closer to the worm, thereby impairing the efficiency of the gearing and improving the condition in respect to play for a rather limited period.

According to the invention, the steering shaft operates two conical spiral actuating elements in a suitable steering gear case at the foot of the shaft, these spiral elements mesh respectively with two gear segments, which are intergeared outside of the spiral elements, and a steering arm is connected with the intergeared segments, so as to be operated alternately thereby, means being provided for relative adjustment of the gear segments whereby play is taken up in respect to reverse working faces of the spirals.

The gearing in its preferred embodiment will now be briefly described, reference being had to the accompanying drawings, wherein:

Figure 1 is a view looking at the outside of the steering gear, with parts broken away;

Fig. 2 is a longitudinal section, looking at right angles to Fig. 1;

Fig. 3 is a view, with the cover removed;

Fig. 4 is a cross-section on the line 4—4 of Fig. 2;

Fig. 5 is a cross-section on the line 5—5 of Fig. 2; and

Fig. 6 is a schematic view of the driving element of the gear.

The drawings illustrate only so much of an automobile steering gear as is necessary to the understanding of the invention.

A tubular steering shaft 1, bearing a wheel 2 at its upper end, passes through and is rotatably supported in an inclined steering column 3, as is customary. Inside of the steering shaft is a fixed tubular bearing 4, within which are the concentric controlling shafts 5, 6, for spark and throttle, also as is usual.

A gear case 7, made up of two sections 8 and 9 bolted together and having a bolted cover 10, is fixedly mounted in the usual location. A lower steering shaft section $1^a$ is secured at its upper end to the lower end of the main section 1 by means of a coupling 11, which can be loosened to permit the lower section to be moved lengthwise relatively to the upper section. To the lower end of the section $1^a$, within the case 7, is screwed the upper end of a hollow body 12, the axial portion of which may be regarded as a part or extension of the shaft section $1^a$. The section $1^a$ passes through a bearing nut 13 in the upper end of the casing, and the lower journal extremity 14 of the body 12 has similar bearing in a nut 15 in the lower end of the casing. End-thrust ball-bearings 16 are inserted between shoulders 17 on the body 12 and the nuts 13 and 15.

The portion of the body 12 intermediate its ends is in the general form of a double, truncated, concave cone 18, the cones being reversely disposed with their common basal portion at the middle. The two conical sides of this double gear element are cut with spiral ledges 19 and $19^a$, respectively, to mesh with the teeth of two gear segments 20, 20ª, which are mounted in the case 7 to turn on axes transverse to the axis of rotation of the spirals. For convenience the two spiral elements will be termed simply spirals. The gear segments 20, 20ª have buttress teeth, that is to say teeth of triangular form with abrupt or substantially radial working faces 21, 21ª and sloping backs 22, 22ª. The spirals 19, 19ª are of complementary buttress section, to mesh with these teeth. The working faces 21, 21ª of the buttress teeth are straight transversely, that is to say in directions parallel with the axis of rotation of the segments, and having sliding line contact with the working faces of the spirals. These meshing gear elements are self-locking, and are adapted to drive with high efficiency and little friction in one direction of rotation only, that is to say the direction which causes the single working face of the spiral to thrust against the abrupt working faces of the teeth.

Each spiral comprises a plurality of convolutions meshing simultaneously with a series of teeth on each segment 20 or 20ª, the variations being such that the spirals mesh with arcs of the gear segments 20, 20ª, and in the two spirals the working faces 23, 23ª are reversed, facing toward the center. The spirals run in the same direction helically, but in reverse directions spirally. This will be understood by reference to Figs. 2 and 6. In other words, starting at one end of the double conical spiral, the ledge 19 winds about the axis in one direction while progressing farther and farther from the axis; passing on over the central basal region to the other spiral, its ledge 19ª winds in the same direction about the axis while approaching closer and closer thereto. When the double actuating member is revolved in one direction, one of the spirals travels uphill while the other travels downhill, and vice-versa.

With these relations, when there is driving engagement between the working faces 23 and 21, the working faces 23 are seeking to move away from the working faces 21ª. Conversely, when the steering wheel is turned in the reverse direction so that there is driving engagement between the working faces 23ª and 21ª, there is no driving action between the faces 23 and 21. The gear segments 20, 20ª, however, are intergeared by two ordinary spur gear segments 24, 24ª, secured to their shafts and meshing together at one side of the double spiral actuating member. Thus movement is transmitted from the gear segment 20 or 20ª, which is being positively driven at any time, to the other gear segment. The said segments 20, 20ª are located at opposite sides of the axis of the actuating member, and consequently revolve in opposite directions.

The shaft 25 bearing the segments 24 and 20 is journaled in bearings 26 in the casing, from which it projects at one side, carrying on its external portion the steering arm 27, which is connected with the steering knuckles by connections of known or suitable character. The other gear segments 24ª, 20ª are fixed upon a sleeve 28 which turns upon a stationary shaft 29 included within the casing. This shaft has eccentric end journals 30, which are rotatable in openings in the opposite sides of the casing. One of the journal ends has a polygonal extremity 31 to receive a polygonal washer 32 retained by a cotter pin 33, this washer affording convenient means for holding the shaft 29 in a series of angularly adjusted positions. Means are thus provided for relative adjustment of the driven gear segments 20, 20ª, so as to take up lost motion between the reversed working faces of both segments and their spirals. In the particular construction illustrated, the segment 20ª is adjusted bodily, the movement being in part at least lengthwise of the axis of rotation of the spirals, so that, upon loosening the upper end bearing nut 13 and the coupling 11, the working faces 21ª of the segment 20ª can be caused to bear upon the spiral working face 23ª and move the double spiral driving member longitudinally, this in turn bringing the spiral working face 23 against the working faces 21 of the segment 20. In this way the play in both of the alternately acting halves of the gearing can be taken up partially or completely, as desired. When the desired adjustment is obtained, the lower bearing nut 15 is screwed upward, the upper nut 13 is brought down, and the coupling 11 is again tightened.

Other forms of the adjustment may be devised, whereby one or both of the segments are shifted so that their teeth where they engage the spirals are caused to press reversely against the reverse working faces of the spirals, the effect being as if one of the segments pulled upon the double spiral body lengthwise of its axis against the pull or resistance of the other segment acting in the opposite longitudinal direction. Of course, it will be understood that the play need not be taken up entirely if some freedom in the steering wheel is desired. In that event the adjustment would be made in the same manner but to a less extent, causing the working faces of the teeth of the segments to be closer to the working faces of the spirals without actually bearing simultaneously thereon.

It will be understood, of course, that the segments 20, 20ª and 24, 24ª might be complete gears, but without advantage, since in the steering operation these elements execute only partial revolutions.

In the operation of the gearing, when the steering wheel and shaft are turned in one direction, the spiral 19ᵃ actuates the segments 20ᵃ. The latter, through the meshing segments 24, 24ᵃ, operates the shaft 25 and steering arm 26, and also positively operates the other segment 20. In the reverse operation the spiral 19 actuates the segment 20, thereby directly operating the shaft 25 having the steering arm 27, and through the meshing segments 24, 24ᵃ positively operating the segment 20ᵃ. The manner of taking up wear from time to time has already been explained.

While the preferred form of the invention has been described in detail, it will be understood that numerous changes may be made in respect to form, proportions, arrangements, reversals, additions and omissions without departing from essentials.

What we claim as new is:

1. An automobile steering gear, comprising a steering shaft, two reversely-disposed conical spiral actuating elements connected thereto, said spiral elements running helically in the same direction and spirally in opposite directions, two toothed wheel segments meshing respectively with said spiral elements, means intergearing said segments, a steering arm connected with the intergeared segments, and means for relative adjustment of said segments to take up play in respect to reverse working faces of the spiral elements, whereby the segments are driven by their spiral elements upon opposite rotational movements of the steering shaft, respectively, to transmit motion alternately to the steering arm.

2. An automobile steering gear, comprising a steering shaft, two reversely disposed conical spiral actuating elements connected thereto, said spiral elements running helically in the same direction and spirally in opposite directions, two toothed segments meshing with said spiral elements at opposite sides of the axis of rotation thereof, two meshing toothed gear elements on the axes of said segments intergearing the same, a steering arm connected with said intergeared segments, and means for relative adjustment of said segments to take up play in respect to reverse working faces of the spiral elements, whereby the segments are driven by their spiral elements upon opposite rotational movements of the steering shaft, respectively, to transmit motion alternately to the steering arm.

3. An automobile steering gear, comprising a steering shaft, two reversely disposed conical spiral actuating elements connected thereto, said spiral elements running helically in the same direction and spirally in opposite directions and being of buttress section to mesh with buttress teeth, two buttress-toothed segments meshing respectively with said spiral elements, the spiral elements and corresponding segments being adapted for driving engagement upon opposite rotational movements of the steering shaft respectively, means inter-gearing the segments, a steering arm connected with the segments, and means for relative adjustment of the segments in respect to the working faces of the spiral elements.

4. An automobile steering gear, comprising a steering shaft, a double conical body connected thereto having a central basal portion and reversely conical sides, said sides being formed each as a spiral actuating element, said spiral elements running in the same direction helically and in opposite directions spirally, two toothed segments meshing respectively with said spiral elements, means inter-gearing said segments, a steering arm connected with said intergeared segments, and means for relative adjustment of the segments to take up play in respect to reverse working faces of the spiral elements.

5. An automobile steering gear, comprising a steering shaft, a double conical body connected thereto having a central basal portion and reversely conical sides, said sides being formed each as a spiral actuating element, the spiral elements running in the same direction helically and in opposite directions spirally, two toothed segments meshing respectively with said spiral element, said segments having buttress teeth and the spiral elements being of buttress section to coöperate therewith, means intergearing said segments, a steering arm connected with said intergeared segments and means for relative adjustment of the segments to take up play in respect to reverse working faces of the spiral element.

6. An automobile steering gear, comprising a steering shaft, two conical spiral actuating elements connected thereto, said spiral elements being disposed base to base, running helically in the same direction and spirally in opposite directions, and being of buttress section to mesh with buttress teeth, two buttress-toothed segments meshing respectively with said spiral elements, means inter-gearing said segments, a steering arm connected with said segments, and means for relative adjustment of the segments.

7. An automobile steering gear, comprising a steering shaft, two conical spiral actuating elements connected thereto, said spiral elements being disposed base to base, running helically in the same direction and spirally in opposite directions, and being of buttress section to mesh with buttress teeth, two buttress-toothed segments meshing respectively with said spiral elements at opposite sides diagonally of the axis of rotation thereof, two meshing toothed gear elements on the axes of said segments intergearing the same, a steering arm connected with the segments, and means for relative adjustment of the buttress-toothed segments with respect to the working faces of the spiral elements.

8. An automobile steering gear, comprising an upper steering shaft section, a lower section having two reversely-disposed conical spiral actuating elements, a steering-gear casing inclosing said lower section and spiral elements, the lower section being movable longitudinally in the casing relatively to the upper section, adjustable end bearings in the casing for said lower section, said spiral elements running helically in the same direction and spirally in opposite directions, two toothed segments meshing respectively with said spiral elements, means inter-gearing said segments, a steering arm connected with said inter-gearing segments, and means for bodily adjusting one of the segments lengthwise of the axis of rotation of the spiral elements.

9. An automobile steering gear, comprising an upper steering shaft section, a lower section having two reversely-disposed conical spiral actuating elements, a steering gear casing inclosing said lower section and spiral elements, the lower section being movable longitudinally in the casing relatively to the upper section, adjustable end bearings in the casing for said lower section, said spiral elements running helically in the same direction and spirally in opposite directions and being of buttress section to mesh with buttress teeth, two buttress-toothed segments meshing respectively with said spiral elements, means intergearing said intergeared segments, a steering arm connected with said segments, and means for bodily adjusting one of the segments lengthwise of the axis of rotation of the spiral elements.

10. An automobile steering gear, comprising a steering gear shaft, two reversely-disposed conical spiral actuating elements connected thereto, said spiral elements running in the same direction helically and in opposite directions spirally and being of buttress section to mesh with buttress teeth, two buttress-toothed segments meshing with said spiral elements respectively, means intergearing said segments, a transverse shaft bearing a steering arm connected to one of said segments, and means for adjusting the other segment to take up play between the working faces of both spiral elements and segments.

11. An automobile steering gear, comprising a steering shaft, a steering-gear casing at the lower end of said shaft, a shaft section in said casing bearing two reversely-disposed conical spiral actuating elements, said spiral elements running in the same direction helically and in opposite directions spirally and being of buttress section to mesh with buttress teeth, said shaft section being longitudinally movable in the casing, two buttress-toothed segments meshing with said spiral elements respectively, means intergearing said segments, a transverse shaft connected to one of said segments inside the casing and projecting outside of the same and bearing a steering arm, and means for effecting bodily adjustment of the other segment so as to displace it lengthwise of the axis of rotation of the spiral elements.

12. An automobile steering gear, comprising a steering shaft, a steering-gear casing at the lower end of said shaft, a shaft section in said casing bearing two reversely-disposed conical spiral actuating elements, said spiral elements running in the same direction helically and in opposite directions spirally and being of buttress section to mesh with spiral teeth, said shaft section being longitudinally movable in the casing, two buttress-toothed segments meshing with said spiral elements, respectively, means inter-gearing said segments, a transverse shaft connected to one of said segments inside the casing and projecting outside of the same and bearing a steering arm, and a shaft supporting the other segment having eccentric journal supports in the casing for adjustment.

13. In a steering gear, a steering shaft, a steering gear case at the foot of the shaft, a longitudinally adjustable driving section in the case bearing reverse concave conical spiral actuating elements running helically in the same direction and spirally in opposite directions, means endwise sustaining and permitting adjustment of said section, two toothed segments meshing respectively with said spiral elements, means inter-gearing the segments, a steering arm connected with the intergeared segments so as to be operated alternately thereby, and means of relative adjustment between the segments whereby their teeth in engagement with the spiral elements are brought into closer opposite bearing relation to the working faces thereof.

14. A steering gear, comprising a steering shaft, a double concave conical spiral actuating member at the foot of said shaft, its spiral elements of buttress section to mesh with buttress teeth and running helically in the same direction and spirally in opposite directions, a pair of buttress-toothed segments meshing with said spiral elements, their teeth in mesh with the spiral elements being reversely disposed for alternate driving action, means intergearing the segments, a steering arm connected therewith so as to be operated first by one and then by the other of the buttress-toothed segments as the steering shaft is turned from side to side, and means for relative adjustment of the segments so as to bring the working faces of their teeth into closer opposite bearing relation to the working faces of the spirals.

15. A steering gear, comprising a steering shaft, a double concave conical spiral actuating member at the foot of said shaft, its spiral elements of buttress section to mesh with buttress teeth and running helically in the same direction and spirally in opposite directions, a pair of buttress-toothed segments meshing with said spiral elements, their teeth in mesh with the spiral elements being reversely disposed for alternate driving action, means intergearing the segments, a steering arm connected therewith so as to be operated first by one and then by the other of the buttress-toothed segments as the steering shaft is turned from side to side, and means for adjusting one of the segments by a rotary movement so as to bring the working faces of both segments and their spiral elements into closer bearing relation.

THOMAS A. McGINLEY.
JOHN C. KOPF.